(12) United States Patent
Little et al.

(10) Patent No.: US 9,852,115 B2
(45) Date of Patent: Dec. 26, 2017

(54) VIRTUAL LIBRARY PROVIDING CONTENT ACCESSIBILITY IRRESPECTIVE OF CONTENT FORMAT AND TYPE

(71) Applicant: Microsoft Corporation, Redmond, WA (US)

(72) Inventors: Robert A. Little, Redmond, WA (US); Zeyad Rajabi, Bellevue, WA (US); Scott M. Stiles, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 83 days.

(21) Appl. No.: 13/753,779

(22) Filed: Jan. 30, 2013

(65) Prior Publication Data

US 2014/0215391 A1 Jul. 31, 2014

(51) Int. Cl.
 *G06F 17/22* (2006.01)
(52) U.S. Cl.
 CPC ...... *G06F 17/2264* (2013.01); *G06F 17/2288* (2013.01)
(58) Field of Classification Search
 IPC .................... G06F 17/2264,17/00, 17/2288
 See application file for complete search history.

(56) References Cited

U.S. PATENT DOCUMENTS

| 5,956,034 A | 9/1999 | Sachs et al. |
| 6,615,212 B1 * | 9/2003 | Dutta et al. |
| 7,039,643 B2 * | 5/2006 | Sena et al. ............... 707/691 |
| 7,047,033 B2 * | 5/2006 | Wyler ................... 455/552.1 |
| 7,836,102 B2 | 11/2010 | Singh |
| 7,873,578 B2 * | 1/2011 | Johnson ............ G06Q 30/0603 380/201 |
| 8,060,489 B1 | 11/2011 | Raman et al. |

(Continued)

FOREIGN PATENT DOCUMENTS

| CN | 1236450 A | 11/1999 |
| CN | 1302398 A | 7/2001 |

(Continued)

OTHER PUBLICATIONS

"International Search Report & Written Opinion for PCT Application No. PCT/US2014/013253", dated May 6, 2014, Filed Date: Jan. 28, 2014, 11 Pages.

(Continued)

*Primary Examiner* — William Bashore
*Assistant Examiner* — Gregory A Distefano
(74) *Attorney, Agent, or Firm* — Talem IP Law, LLP

(57) ABSTRACT

A virtual library of content is provided that makes it appear that the content is all of a supported file type for a particular client accessing the virtual library. When the virtual library is displayed at a client device, the content appears as if it is available in the appropriate format for the client device irrespective of the content's actual format. Content selected from a content library interface for the virtual library is provided in the appropriate format for the client device through the automatic invoking of a content access service. The content access service can determine the appropriate consumption format for the client device and convert to a supported file format any content that is in a non-supported format before providing the content to the client device.

7 Claims, 8 Drawing Sheets

(56) References Cited

U.S. PATENT DOCUMENTS

| | | | |
|---|---|---|---|
| 2002/0111995 A1* | 8/2002 | Mansour et al. | 709/203 |
| 2003/0135860 A1* | 7/2003 | Dureau | H04N 21/43615 725/82 |
| 2003/0182450 A1 | 9/2003 | Ong et al. | |
| 2005/0132264 A1* | 6/2005 | Joshi | G06F 17/30017 715/202 |
| 2006/0179109 A1* | 8/2006 | Ko | H04L 29/08729 709/203 |
| 2007/0067336 A1 | 3/2007 | Horany | |
| 2007/0121651 A1 | 5/2007 | Casey et al. | |
| 2008/0207182 A1* | 8/2008 | Maharajh | G06F 17/30035 455/414.1 |
| 2008/0216009 A1 | 9/2008 | Drallos | |
| 2008/0293450 A1 | 11/2008 | Ryan et al. | |
| 2009/0063431 A1* | 3/2009 | Erol | G06F 17/30247 |
| 2011/0296291 A1 | 12/2011 | Melkinov et al. | |
| 2012/0066373 A1 | 3/2012 | Ochoa et al. | |
| 2012/0192055 A1 | 7/2012 | Antebi et al. | |
| 2012/0239727 A1* | 9/2012 | Dutta et al. | 709/203 |
| 2014/0130134 A1* | 5/2014 | Arora | G06F 21/629 726/4 |

FOREIGN PATENT DOCUMENTS

| | | |
|---|---|---|
| CN | 1330336 A | 1/2002 |
| CN | 101059800 A | 10/2007 |
| EP | 1139253 | 10/2001 |
| EP | 2458514 A1 | 5/2012 |
| WO | 9949383 | 9/1991 |

OTHER PUBLICATIONS

Churchill, Sam, "New Kindle File Format", Retrieved at <<http://www.dailywireless.org/2011/10/21/new-kindle-file-format/>>, Oct. 21, 2011, pp. 9.

Bridgwater, Adrian, "Altova Reveals Release 2 of MissionKit 2012", Retrieved at <<http://www.drdobbs.com/database/altova-reveals-release-2-of-missionkit-2/232601493>>, Feb. 27, 2012, pp. 4.

"Super Simple—File Format Automation for Your App", Retrieved at <<http://saaspose.com/api/words>>, Retrieved Date: Oct. 30, 2012, pp. 3.

"iBooks", Retrieved at <<http://ric.libguides.com/content.php?pid=300774&sid=2666314>>, Retrieved Date: Oct. 30, 2012, pp. 2.

North, Meg, "Can the Sony Reader Take Kindle Books?", Retrieved at <<http://www.ehow.com/info_12130591_can-sony-reader-kindle-books.html>>, Retrieved Date: Oct. 30, 2012, pp. 2.

"Converting Microsoft Office Binary Files to Open XML Formats", Retrieved at <<http://msdn.unicrosoft.com/en-us/library/office/jj649005.aspx>>, Retrieved Date: Oct. 30, 2012, pp. 4.

"International Search Report & Written Opinion for PCT Patent Application No. PCT/US2014/013091", dated Oct. 6, 2014, 10 Pages.

"Second Written Opinion Issued in PCT Patent Application No. PCT/US2014/013091", dated Feb. 11, 2015, 5 Pages.

"Office Action and Search Report Issued in Taiwan Patent Application No. 102147996", dated Feb. 2, 2017, 10 Pages.

"Office Action Issued in Chinese Patent Application No. 201480006755.0", dated Dec. 19, 2016, 14 Pages.

* cited by examiner

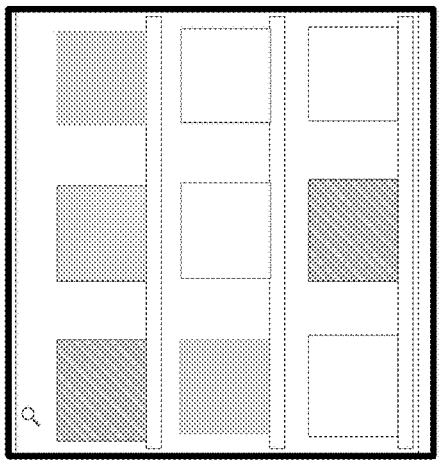
FIG. 5A
FIG. 5B
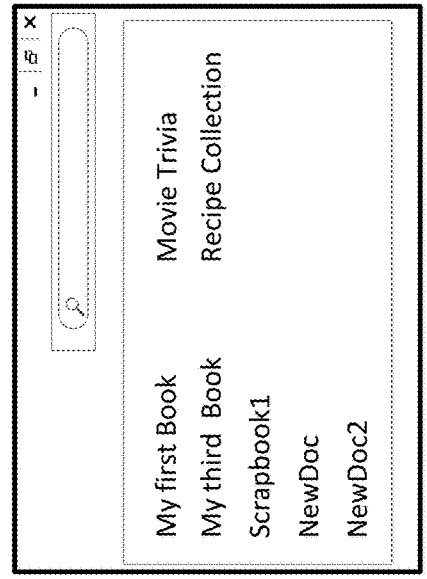
FIG. 5C
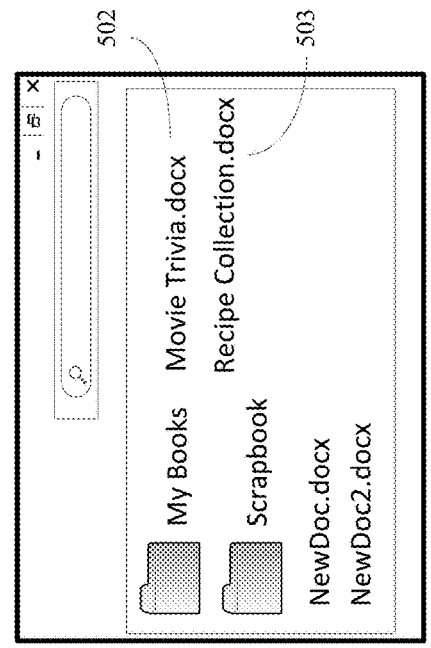
FIG. 5D

VIRTUAL LIBRARY PROVIDING CONTENT ACCESSIBILITY IRRESPECTIVE OF CONTENT FORMAT AND TYPE

BACKGROUND

The ability of a person to access digital content can depend, in part, on whether the person has the appropriate software program that recognizes the format of the digital content and a device that can execute the program so that the digital content can be viewed. With the proliferation of devices using different platforms, it can be a challenge to share and access content of one format with a device running a program capable of only accessing and displaying a different format.

For example, a document may be created in a DOCX format (signifying the Office Open Extensible Markup Language (OOXML) format) for a recent version of the MICROSOFT WORD document and word processing software available from Microsoft Corp., but the author would like to view the document on a reader such as the BARNES & NOBLE NOOK brand e-reader tablet available from Barnes & Noble, Inc., which may use an electronic publication (ePub) file format, or the AMAZON KINDLE available from Amazon.com, Inc., which may use a proprietary AZW and KF8 format. In order to view the document on the reader, the document is converted to the appropriate format by an active step, for example, by creating a copy in the appropriate format.

In order to enable content to be consumed across many device platforms, the author or distributor of the content creates copies in each format or the readers contain converters to read and display that particular format. This creates an environment where consumption of content is constrained by format and file type.

BRIEF SUMMARY

A virtual library, cloud services with content library interfaces and methods of displaying content files for selection and viewing are described.

A virtual library of content is provided that enables the appearance that content from various sources (and storage locations) as well as various file formats are in a single place and of a same file format. According to some embodiments, the content of the virtual library is presented without reference to file format and type or with a false indication that the content is of a particular file format and type. The virtual library can be used to present client-customized content libraries that, when displayed at a client device makes it appear that the content is all of a supported file type for the particular client accessing the virtual library.

A content library interface is described that includes a listing of content available for selection by a consumer device, the content being irrespective of supported file format(s) for the consumer device. Selection of content via the content library interface invokes a content access service to provide the content in a consumption format. The content access service can convert content in non-supported file formats to a supported file format and tailor the content to suit a specific device in order to provide the content in the consumption format. The client device can be unaffected by the originating file formats for the received content because the appropriate file format is provided to the client device from the content access service.

A method is described that includes displaying, at a consumer device, available content for selection, the available content being irrespective of supported file formats for the consumer device; and in response to a user selection, displaying a selected content of the available content in a client-specific consumable format. The available content for selection can be displayed as being of the consumable format irrespective of the file format in which the content is stored.

A method is described that includes providing information on available content for selection, the available content being irrespective of supported file formats for a consumer device; determining a consumable format for the consumer device receiving the information on the available content for selection; and in response to receiving a selection for a selected content of the available content for selection, providing the selected content in the consumable format. The selected content can be retrieved by the system from a storage location and, if the content is not in a supported file format, then the method includes converting the content to a supported file format before providing the selected content in the consumable format.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 5A-5D illustrate example library interfaces where content appears to the user as being available and consumable.

DETAILED DESCRIPTION

Figure 1:
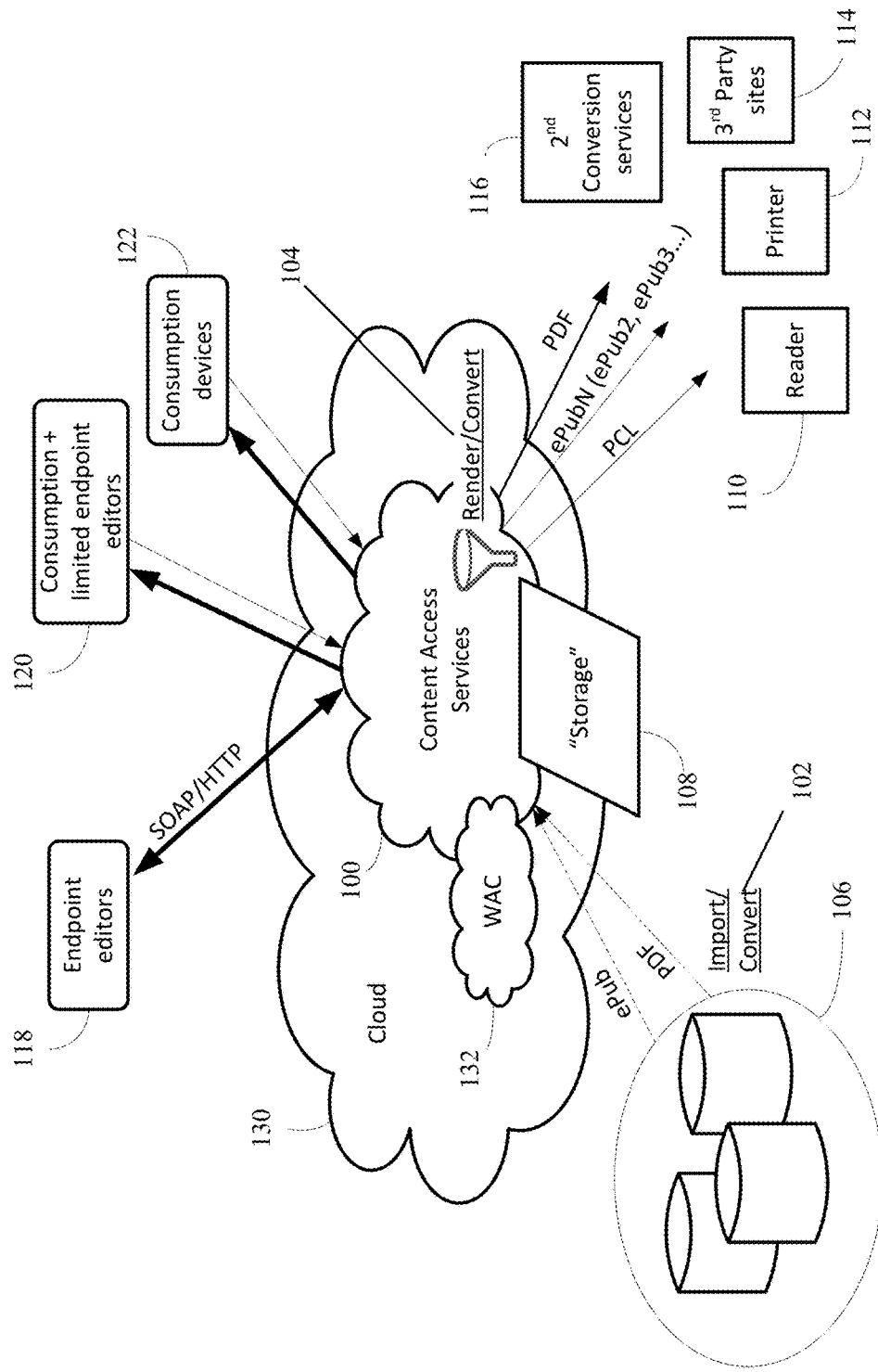
FIG. 1 shows a diagram of an operating environment in which certain embodiments may be carried out.

A virtual library and content access services are described. According to certain embodiments, a virtual library is provided that facilitates the presentation of an entire inventory of content across multiple devices irrespective of the file formats and types supported by a particular client device. The content presented by the virtual library can come from any storage location directly or indirectly accessible by the particular client device, including content stored within the device, on a cloud, or in a database wired or wirelessly connected to the particular client device.

A file format (for a document or other content and related information) refers to the manner in which information related to the content of a file (and, in some cases, associated information) is encoded and stored on a computer-readable medium. A file type may be used interchangeably with file format, but generally refers to the taxonomy of file formats.

For example, a file type may be a document file type, which includes file formats of hypertext markup language (HTML), ADOBE Portable Document Format (PDF), MICROSOFT WORD document (DOC), OOXML (DOCX) and the like.

As used herein "consumption format" refers to a file format supported by a particular device or software program (e.g., a "supported file format"). In addition to being a supported file format, the consumption format can include features related to file size, functionality, and the like that relate to how a device (or program) may be able to support varied user experiences.

According to some embodiments, content is presented as available through a virtual library without reference to file format or type, or by a false indication that the content is of an appropriate file format for a particular consumer. In some embodiments, content is presented as if the content is of a particular file format irrespective of the actual file format in which the content was created. As part of the access services, a conversion service is provided to facilitate access to the content of varied file formats and types.

Content access services are disclosed that include importing data files, methods of displaying the data files for selection and viewing, and converting the data files to reader-type consumable format based on the particular consumer device accessing the data files. Through these services, consumer devices can access content across various platforms without adding complexity to a client-side software or consumption device.

A consumer device refers to a computing device that is used to consume (i.e. use or view for reading) data or documents retrieved or purchased from a service or source. The consumer device may be a reader, which is a primarily single purpose computing device used for reading electronic books, or a multi-purpose computing device on which reader or viewer software for reading electronic books or other electronic/digital content may be provided.

A "viewer" refers to a software or hardware application that can display or appear to display a document or data in a format or file type associated with a particular program. A viewer for a particular file format is able to understand the particular file format and present a visualization of the file. Typically, a "viewer" of a file format is assumed to be able to visually present the file format with high fidelity, maintaining the original intent of the author. A "reader" is a type of viewer that includes functionality primarily associated with a "reading" experience, such as providing animated page turns, remembering a last reading position, providing a dictionary to look up words, and the like.

A "reader" refers to a software application and/or electronic device designed primarily for the purpose of reading electronic books (ebooks) and/or other electronic content. Example software ebook readers include GOOGLE READER, APPLE IBOOKS, ACROBAT EBOOK READER and MICROSOFT READER applications. Example hardware ebook readers include the AMAZON KINDLE and BARNES AND NOBLE NOOK. An ebook is a text and/or image based publication in digital form that can be read on an ebook reader. There are a variety of ebook and other digital content formats used to create and publish content, such as ePub, HTML, PDF, printer command language (PCL), and extensible markup language (XML).

Content can be provided to consumers without them having to be aware that the content may actually be of a different file format than generally useable or viewable via their device. According to certain embodiments, consumers can be insulated from file format changes and, in some cases, from restrictions to viewing and accessing content across platforms. The techniques, interfaces, and methods described herein can be used to facilitate the moving of a user experience from files and formats to a scenario driven experience.

According to certain embodiments, content access services including on-demand rendering and file export services can be provided as part of a cloud service experience. In this manner, content may be created in one format and then be accessible across any platform in a manner that may provide a seamless experience to a consumer of the content.

FIG. 1 shows a diagram of an operating environment in which certain embodiments may be carried out.

Referring to FIG. 1, the operating environment can include one or more cloud or web services. The content access services 100 described herein may be cloud services or web services. A cloud service generally refers to hosted services providing scalable processing and storage capabilities. Cloud computing may often include virtualized resources. The resources presented by cloud computing are in themselves provided as a service, where cloud computing customers rent usage of resources from a third-party provider that owns the physical infrastructure. Web services can be provided and/or hosted by a cloud service (e.g., as part of a large-scale distributed computing environment). A web service is a software system that supports interoperable machine-to-machine interaction over a network and enables software to connect to other software applications.

A web service provides a collection of technological standards and protocols. For example, a web service provides functions that may be implemented by a software or hardware agent that sends and receives messages (e.g., the computing platforms requesting and providing a particular service). Applications can access web services via ubiquitous web protocols and data formats such as hypertext transfer protocol (HTTP), XML, JavaScript Object Notation (JSON), and SOAP (originally an acronym for simple object access protocol).

Representational state transfer (REST) protocols are useful when accessing named resources and may be used in certain embodiments of the invention. In other embodiments of the invention SOAP may be utilized. In some cases, a File Synchronization Service via SOAP over HTTP (FSSHTTP) from Microsoft Corp. may be used.

Content access services 100 may be implemented using one or more physical and/or virtual servers communicating over a network. The network can include, but is not limited to, a cellular network (e.g., wireless phone), a point-to-point dial up connection, a satellite network, the Internet, a local area network (LAN), a wide area network (WAN), a WiFi network, an ad hoc network or a combination thereof. Such networks are widely used to connect various types of network elements, such as hubs, bridges, routers, switches, servers, and gateways. The network may include one or more connected networks (e.g., a multi-network environment) including public networks, such as the Internet, and/or private networks such as a secure enterprise private network. Access to the network may be provided via one or more wired or wireless access networks as will be understood by those skilled in the art.

The content access services 100 can include an import/convert portion 102 and a render/convert portion 104. Documents from various sources 106 can be imported to the content access services 100. The import/convert portion 102 can facilitate self-publishing by reducing or removing constraints to getting content into the particular formats required by readers. For example, self-publishing to a bookstore or other repository or store may be accomplished without requiring the creator to work within a specified file format. By making it easier for creators to publish their work, reader users can have access to more content.

In some cases, imported documents (e.g., through import/convert portion 102) may be stored or appear to be stored (by having an address or Uniform Resource Identifier stored) as part of the cloud (108). The content access services 100 may resolve to operations on storage 108 or delegate certain operations to another service (that may directly or indirectly access storage 108).

Document files can be exported from the content access services 100. Before being exported, a document file, such as one of the imported documents, can be converted to various formats for consumption (e.g., rendering for display, interaction, modification, or additional actions including printing and further conversions) by endpoints such as reader 110, printer 112, third party sites 114, and secondary conversion services 116.

An endpoint refers to the means by which a consumer accesses a service—the entry point for the interaction. According to various embodiments, endpoint customization is provided that extends the reach and changes the way the content is consumed based on device.

By knowing the device, the system (e.g., through services 100) can provide a customized file formatting. Content within a document may be modified in order to be optimized for a particular device. For example, a table can be broken up into meaningful pieces to accommodate smaller screens. As another example scenario, a NOOK reader or a KINDLE reader user may use that device to browse for available content to read. The service 100 can determine what device is being used and appropriately tailor the presentation of content. For example, ePub2 or ePub3 format may be sent to a NOOK reader and AZW format may be sent to a KINDLE reader.

In further embodiments, by also knowing the user (for example, by receiving an identifier from the user, such as when the user logs in to their account from a device), the system (e.g., through services 100) can further enable a user to access their own files over a network on many devices without the user having to be concerned with the version or file format their device can handle. In addition to enabling a user to access their own files, by knowing the user, the system can customize a file to present specific content in a document related to a task associated with the user. For example, where a user is tasked with reviewing a paragraph, the paragraph may be provided to the identified user instead of all users that may have access to the document.

Endpoints may have two general categories of communication with the service 100. One is a two-way rich experience and the other is a more limited experience. In both cases, by using embodiments of the invention, endpoints are not required to handle file format conversion or be able to render all formats.

Endpoints of varied richness can be supported by various embodiments of the invention. As used herein, "richness" refers to the spectrum of available experiences with an application and its ability to present a user with particular content and functionality. For example, a richest consumption experience can be available through devices supporting full featured applications in which editing and manipulation of content is available (e.g., endpoint editors 118. A more limited experience includes bite-sized authoring tools (e.g., limited endpoint editors 120) in which some functionality for editing and manipulation of content is maintained. Readers (e.g. consumer devices 122) in which the content may be viewed can have a range of supported richness.

One framework by which the endpoint editors 118 may communicate with the web service (e.g., service 100) is via a framework that allows client applications to efficiently synchronize changes to a document and file management and collaboration program running on a server, such as the MICROSOFT SHAREPOINT web application platform, using a FSSHTTP application programming interface (API). The client side of the FSSHTTP protocol is a pass-through. For example, calls made by a higher-layer protocol, such as the application layer, are passed directly to the transport layer, and the results returned by the transport layer are passed directly back to the higher-layer protocol or application.

The conversion and merge service 100 may be associated with broader cloud services 130 as well as a web application component (WAC) 132. WACs are components that enable a user to view and edit documents in the browser. WACs can function both as an endpoint by consuming and editing content and a service by providing some merge and conversion service functionality. In such embodiments, users have access to application software and databases on the cloud, which manages infrastructures and platforms. End users access software applications hosted on the cloud through a browser or app (an application designed for mobile devices such as smartphones and tablets).

Figure 2:
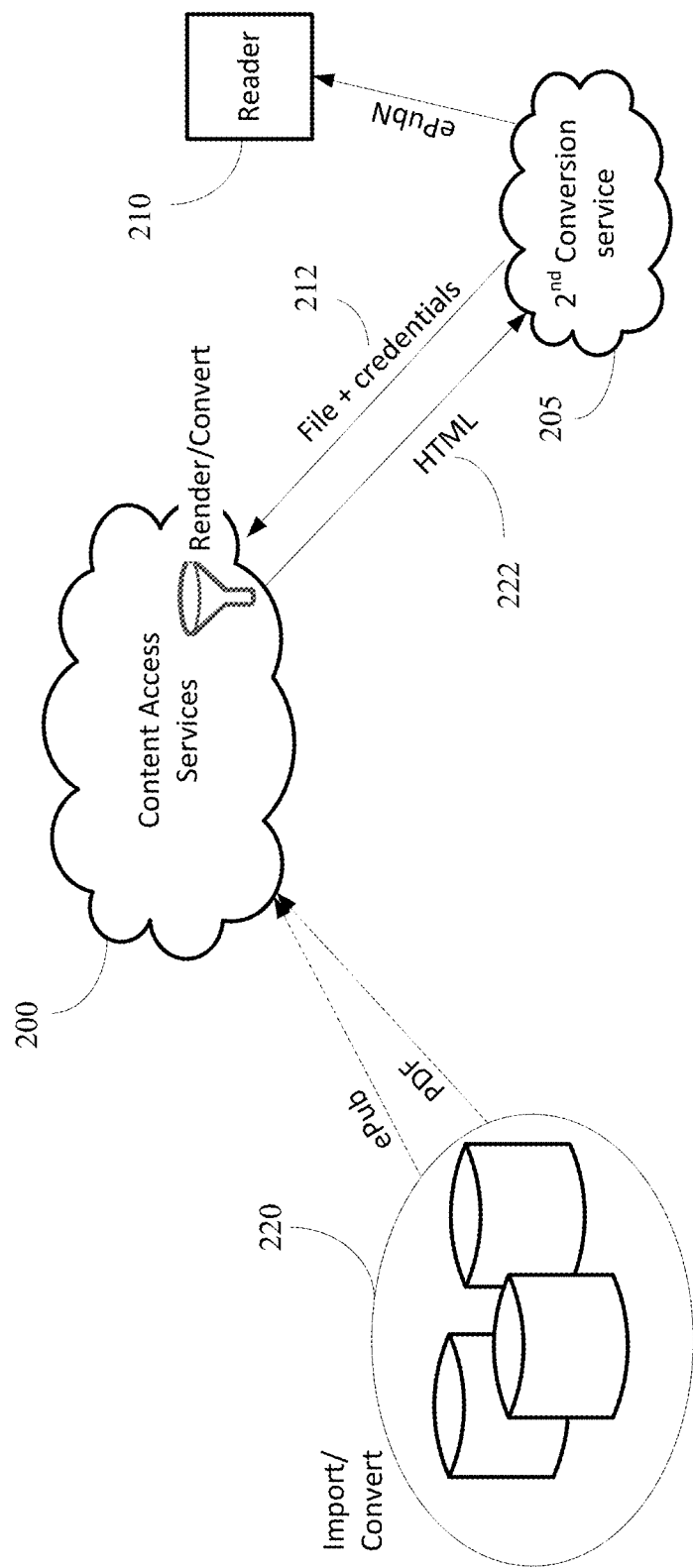
FIG. 2 shows a diagram of an operating environment illustrating an example embodiment.

FIG. 2 shows a diagram of an operating environment illustrating an example embodiment. Content access services 200 may provide an extensibility layer on the cloud that an ebook service, such as part of an ebook store, may integrate into their users' experiences. In some cases, the content access services 200 can be an intermediary for the ebook service by publishing documents in an intermediate format before a second conversion service 205 (via the ebook service, for example) converts the document to a native format for its readers (e.g., reader 210). The additional conversion may be helpful in cases where a new file format not yet supported by the content access services 200 is used for a particular device or a proprietary format is used by the ebook service. The content access services 200 can also extend the reach of available content for the ebook service.

In operation, an ebook secondary conversion service 205 can call the content access services 200 with a request and credentials (212) for a particular file. The credentials may be used by the services 200 to retrieve the file from another source 220 (which may include impersonation) or provide access to a source hosted by the cloud. The credentials may be part of an authentication process.

Authentication refers to a process by which an existing identity store is used to access resources. Access to requested files and folders can be controlled based on a configuration file that indicates users and groups of users that should have access to requested resources, file authorization, and/or role checks (using, for example, authorization logic and a role manager). Impersonation refers to the ability of a thread (a sequence of programmed instructions) to execute using different security information than the process that owns the thread. For example, a client (such as reader 210) may own a thread, but a server application (such one associated with the ebook secondary conversion service 205 or the content access services 200) can impersonate the client in order to execute the thread. This allows the server thread to act on behalf of that client to access objects (e.g., the document) on the server or validate access to the client's own objects.

In response to receiving a file request and credentials (212), the content access services 200 may return a document in, for example, HTML format (222). The document (retrieved by the content access service 200) may originally be in HTML or may be converted by the service 200 to HTML before exporting to the ebook secondary conversion service 205. The ebook secondary conversion service 205 may then provide the document in an appropriate format for a reader 210.

As an example scenario, a service operated on behalf of Barnes and Noble, Inc. or Amazon.com, Inc. may provide the ebook secondary conversion service 205 and interact with the content access service 200 by sending the request for the file (212). The content access service 200 can appropriately tailor the presentation of the content, for example by providing an intermediate format, such as HTML, to the service 205 operated on behalf of Barnes and Noble, Inc. or Amazon.com, Inc. (or some other company) so that the service 205 may convert the HTML file into the appropriate format such as ePub2 or ePub3 (for the NOOK reader) or AZW (for the KINDLE reader). In another embodiment, the content access service 200 can provide the document in the ePub2 or ePub3 or AZW format to the second conversion service 205, which can then provide the document to the reader 210.

Figure 3:
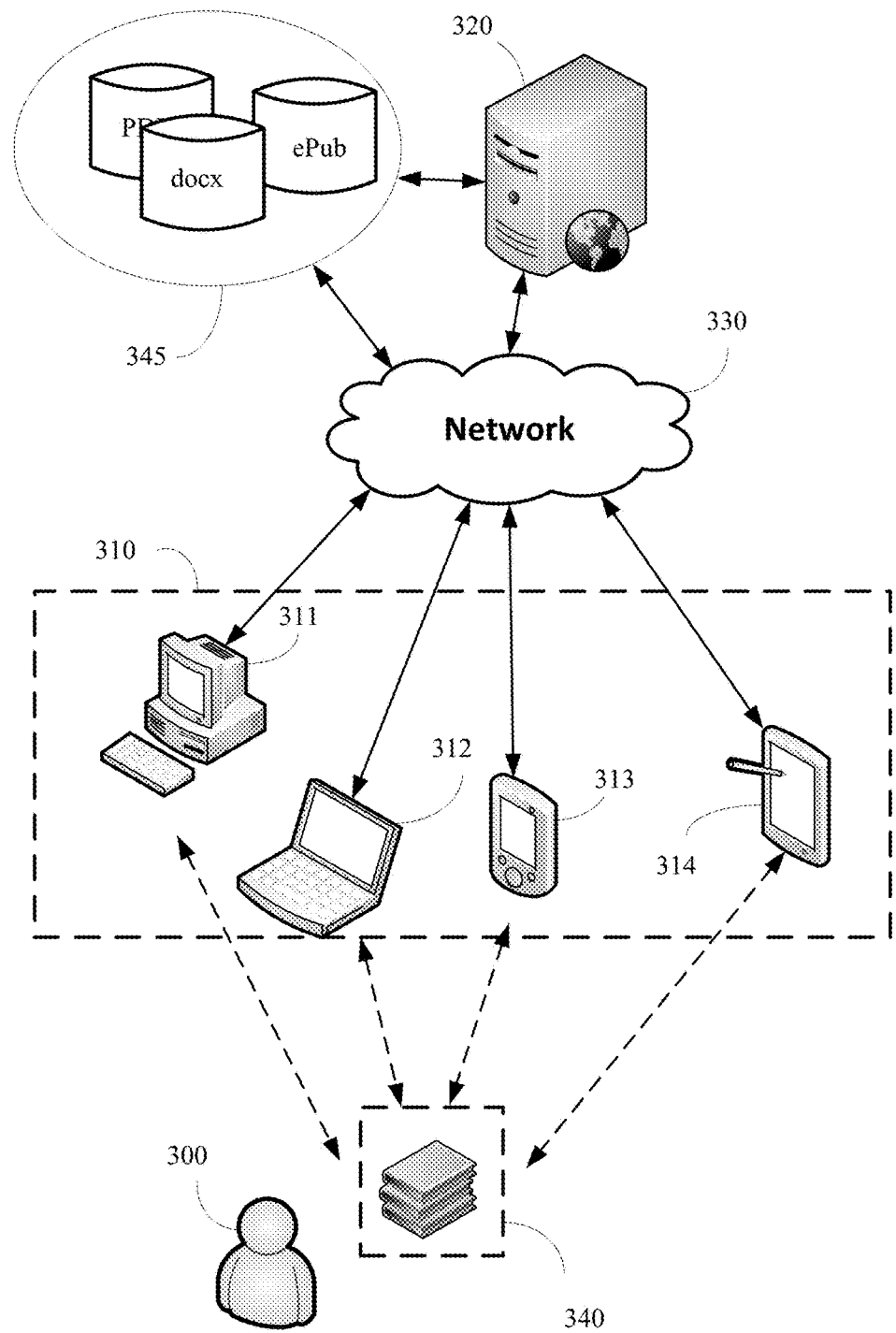
FIG. 3 shows a computing environment according to an embodiment.

FIG. 3 shows a computing environment according to an embodiment.

As illustrated in FIG. 3, a computing environment for a user 300 can include multiple clients 310 (such as desktop 311, laptop 312, smartphone 313, tablet 314, reader (not shown), game console (not shown), smart television (not shown), and the like), and a server 320 connected through a network 330.

In accordance with certain embodiments of the invention, the network 330 may be an internet, an intranet, or an extranet, and can be any suitable communications network including, but not limited to, a cellular (e.g., wireless phone) network, the Internet, a local area network (LAN), a wide area network (WAN), a WiFi network, an ad hoc network or a combination thereof. Such networks may involve connections of network elements, such as hubs, bridges, routers, switches, servers, and gateways.

The network 330 may include one or more connected networks (e.g., a multi-network environment) including public networks, such as the Internet, and/or private networks such as a secure enterprise private network. Access to the network 330 may be provided via one or more wired or wireless access networks as will be understood by those skilled in the art. As will also be appreciated by those skilled in the art, communication networks can take several different forms and can use several different communication protocols.

The client(s) 310 and server 320 can involve computing systems configured with one or more central processing units (CPUs), memory, mass storage, and I/O devices (e.g., network interface, user input device). Elements of a computing system can communicate with each other via a bus. The hardware platform of computing systems can be embodied in many forms including, but not limited to, a personal computer, a server computer, a hand-held or laptop device, a multiprocessor system, a microprocessor-based system, programmable consumer electronics, and a distributed computing environment that includes any of the above systems or devices.

Each client 310 can include a software application for viewing and, in some cases, editing content retrieved from the server 320.

The server 320 is a hardware device and/or software program configured to provide (as part of content access services) a virtual library 340 and conversion service that allows users to access content (even the user's own content) that may be of a file format not directly supported by a specific client 310 that the user is using to access the content. One or more of the services (or functions) provided by the server 320 can be executed in a cloud computing environment.

The server 320 can include applications (and/or host a service) exposed through an API. According to certain embodiments, a system, involving server 320, may be provided that can import a document from a client 310 or database 345 and convert the document into a format suitable for a particular consumer device (e.g., desktop 311, laptop 312, smartphone 313, tablet 314, reader (not shown), game console (not shown), and the like). The server 320 and the consumer/client device 310 communicate such that the system knows what type of device or software is available on the client 310 and tailors the user's experience accordingly.

The server 320 can be configured to identify the user agent/client characteristics at the endpoint. The identification may be based on an active or implicit notification sent from the endpoint (e.g., client 310) to the server 320. The server 320 can further be configured to tailor the client experience as well as the persisted experience (e.g., the stored copy). For example, the tailored client experience can include reflowing content to accommodate smaller (or larger) display sizes, as well as additional accommodations.

Reflowing refers to the accommodation of viewing content for a limited display or window, where text may remain at its original size for ease of reading while images reduce in size so that they can be viewed at a glance.

To illustrate additional accommodations, a high resolution device can be served high resolution content (a higher form factor can receive more objects), whereas a phone may receive a lower resolution image (instead of, for example, a 12 megapixel version of a picture in a document). As another example, the server 320 may detect that the client 310 is using a device with a small screen, such as a smartphone. In such a case, the server may look to optimize the objects contained within the document, such as graphics and tables, in order for the device to render a customized document with accommodations due to screen size.

As illustrated by FIG. 3, a user may have multiple clients 310 (e.g., a desktop computer 311 in the office, a laptop 312 at home, and a mobile telephone 313), and may use software ebook readers or document viewers/editors running on these clients 310 to read ebooks and other digital content retrieved from the server 320. The server can present the available content in the form of a virtual library 340.

For example, a user 300 can have access to a virtual library 340 of documents (stored, for example, in cloud database 345) of potentially disparate file formats and be presented with the same available library (340) across each device (e.g., 311, 312, 313, 314), but where the content appears to be of the file format suitable for the client accessing the library 340.

The virtual library 340 may be stored as a collection of addressable files. When a document is included in the virtual library 340, a name and pointer (or address or other way to find and access content) is stored. In some embodiments, an identifier can be associated with the document. The identifier can be stored as part of the document (as metadata) or as part of a storage service. The actual physical file may or may not be stored in the cloud (as part of cloud storage—such as database 345). The file may be stored on a server or computer or any storage location that can be accessed by the service over a network. The virtual library 340 becomes a promise of a file in the format that a user 300 (based on their device) is most likely to be able to consume.

Figure 4:
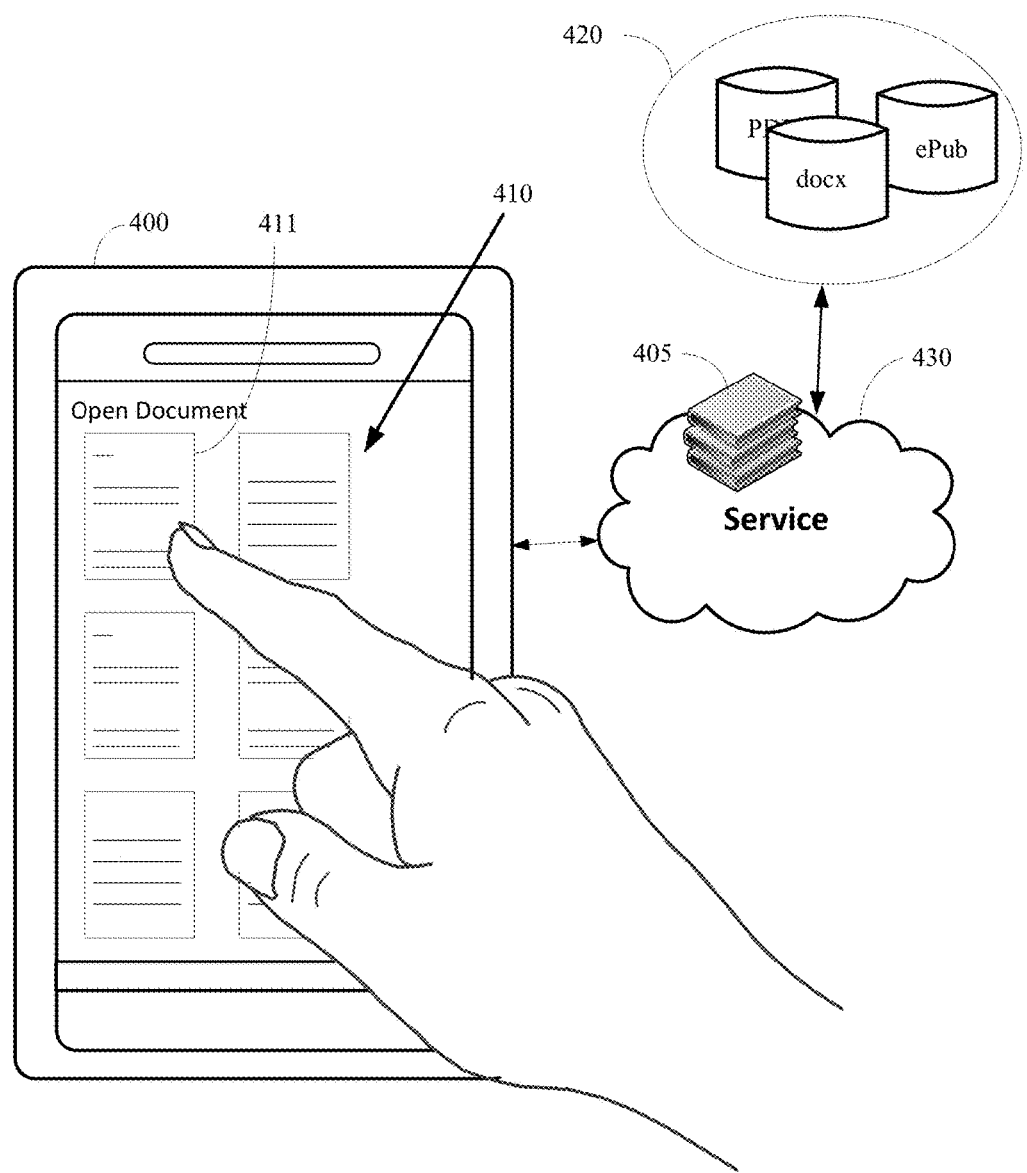
FIG. 4 shows a diagram illustrating an example computing environment.

FIG. 4 shows a diagram illustrating an example computing environment.

Referring to FIG. 4, a user can access their cloud content (that they own or are purchasing) through a consumer device 400. The content can be accessed through an interface for a content library 405. The content library 405 can include a listing 410 of content 420 available for selection by the consumer device 400. Instead of only providing a listing of content that is directly consumable (e.g., renderable) by the consumer device 400 (or the software program running on the consumer device), the content 420 presented as being available to the consumer device 400 is irrespective of supported file formats for the consumer device 400.

For example, the actual format for the content 420 may include, but is not limited to, PDF, docx, and ePub. Selection of content such as content 411 from the listing of content available via the consumer device 400 invokes a content access service 430 to provide the content in the appropriate consumption format for the device 400.

In some embodiments, when a document is selected by a user, the service 430 can determine the device being used and tailor the content of a document to a format that best suits the device—even adding experiences that suit one device over another. For example, if it is determined that a high resolution device is accessing the service, a high fidelity version can be sent to the device.

When the service receives a request from a client device running the MICROSOFT WORD document processing application (and the request, for example, occurs when the user tries to open files from within WORD), the service, once determining that it is MICROSOFT WORD (and what version) that has made the request, can present all files as DOCX (or DOC). Similarly, when the service receives a request from a NOOK or KINDLE reader, the service can present the files as if they are all ePub files (or other supported files for the reader). The ePub files and the DOCX (or DOC) files may not exist, but when those particular clients request "document15.ePub" or "document15.docx", the server understands that the client is requesting a virtual document15, which can be stored somewhere in the cloud (or at a particular location), and will serve the document to the client in a format that can be consumed by the client.

In many operating systems, a user can open a document through a folder or file, which will launch the appropriate application upon selection, or from within a program by selecting a file through a menu option. Generally, in both cases, a window is provided in which the files or folders are displayed for selection. In the first case, the files may show an indication as to the program that will open the file for viewing. This indication is often a file name extension and/or an icon representing the appropriate program. If a user does not have the appropriate program installed on their device, the user will either not be able to open the document or will be prompted to find a program to open the document. In the second case, only the files that the program is able to open are displayed in the window.

Embodiments of the invention provide a library in which all files are "viewable' by a reader or other device regardless of the actual file format. That is, the reader or other device is made to believe that the files are all of the appropriate file type even if the files are not. The virtual library listing the available content makes it appear that the files are in the appropriate file format and type.

A feature of the virtual library is that the file format of each document in the library is promised (i.e. indicated as being available) in a format that may not actually exist stored on the server. Instead of pre-converting all files stored on the server to every type of file format, a particular format for a document is delivered upon request by a user. A virtual library generally refers to a listing of documents (or other content) that appear to be stored in one location, but are actually stored in one or more other locations. In accordance with embodiments of the invention, the virtual libraries provide listings of documents (or other content including, but not limited to, video, audio, and text) that appear to be of a particular file format, but are actually stored in any one of a variety of formats. Of course, in some cases the document may actually be stored in the file format that the virtual library indicates the file is stored as.

Embodiments provide a system in which documents are presented to a user as if they are in the format needed for a particular client—even if the document does not actually exist in that format until the time that the user selects the document for viewing (or editing).

In one embodiment, a listing of files is provided as if the files all reside on the system and are of a particular file format, but the files are actually obtained (and converted when needed) in response to a request for a file. For example, if the user selects to "Open" a file from within MICROSOFT WORD and browses the available libraries, all the files residing on the server (or accessible by the server) are presented as DOC or DOCX files. Then, if the user selects to "Open" a file from within the ADOBE ACROBAT application and browses the available libraries, the same files can then be presented as PDF files. Similarly, if the user is browsing available content from a NOOK reader, all of the files are presented as ePub, for example.

FIGS. 5A-5D illustrate example library interfaces where content appears to the user as being available and consumable.

FIG. 5A shows an example library interface for a reader where a self-published document "My Creation" 501 is included as part of the ebooks available to the user. This document is presented as if it is in the same format as the other ebooks even though it may not be stored in the appropriate format or converted by an ebook publisher after the document was created.

FIG. 5B shows another example library interface for a reader. The interface shown in FIG. 5B represents a bookshelf with images for each ebook. Here, any document may be presented as an ebook, for example a presentation document, a word processing document, or some other document may be included in the listing in a manner that the user will not experience a distinction based on originating document file format.

FIG. 5C shows an example library interface window in which all the documents are displayed as being in the DOCX file format. Although the documents are shown as being in the DOCX file format, this file name extension is part of the virtual library display and may not reflect the file format of the stored document. For example, "Movie Trivia" 502 may be in an ePub format and "Recipe Collection" 503 may be in a PDF format. However, all documents are displayed as being of the DOCX file format. In addition, when one of these documents is selected by the user, the content access service (e.g., a conversion service portion) can convert any document that is not stored in the DOCX format to the DOCX format for the user.

FIG. 5D shows another example library interface. As shown in FIG. 5D, no file name extensions are provided. Instead, a listing of all documents is presented. A user can select any one of the documents irrespective of their actual file formats and the conversion service can provide the document in the appropriate format.

Figure 6:
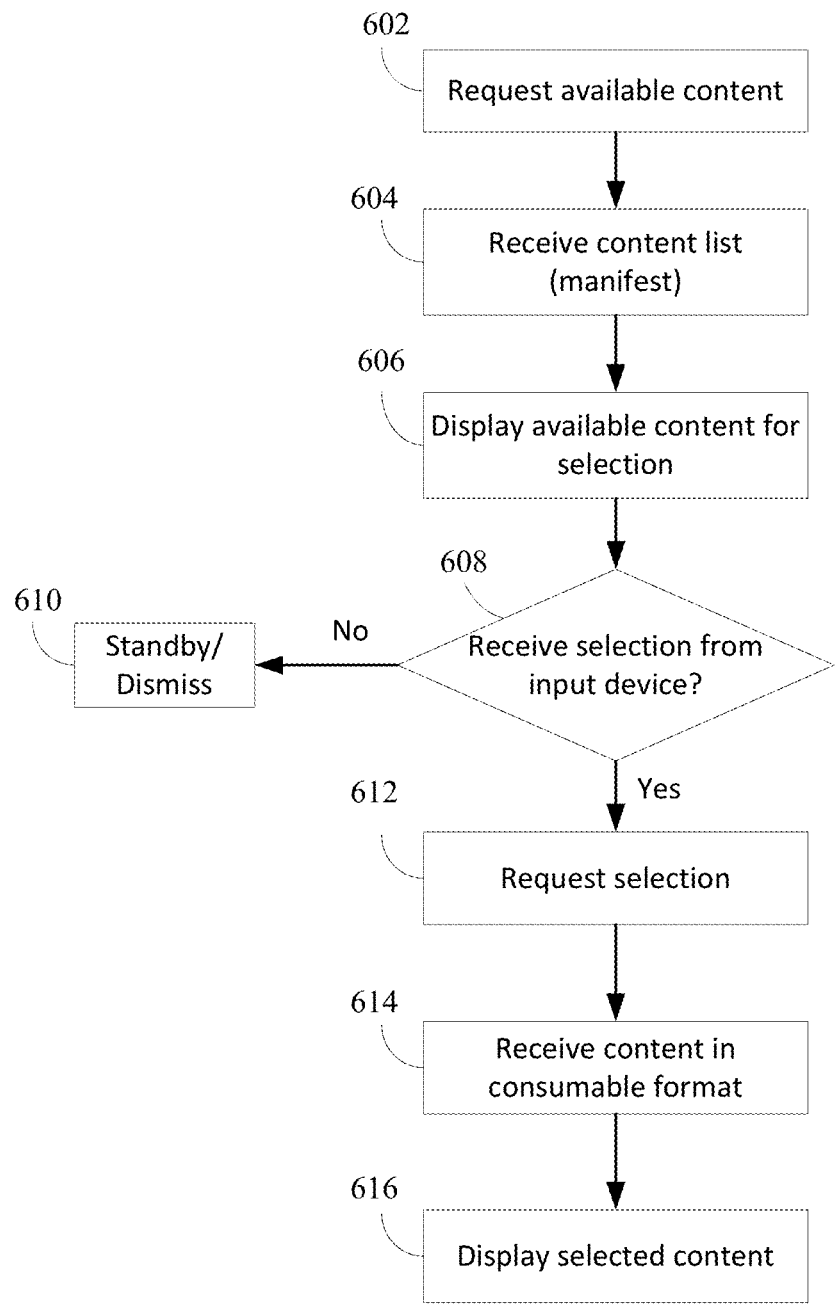
FIG. 6 shows a process flow diagram of a method of receiving content according to an embodiment of the invention.

FIG. 6 shows a process flow diagram of a method of receiving content according to an embodiment of the invention. A client may invoke a content access service (e.g., service 430 of FIG. 4) to request available content (602). In one embodiment, the action of browsing a library of available content may cause the service to be called. After requesting available content, a content list or manifest may be received (604). The content list or manifest provides a listing of available content from a content library (e.g., library 405 of FIG. 4). The content list may include a listing of documents that would not typically be consumable by the client due to being of a different (and possibly incompatible) file format. However, all content—irrespective of file format—is received as part of the list being available for selection. That is, the content is presented as being available irrespective of supported file formats for the client.

After receiving the manifest (604), the content list can be stored, for example, in a local cache before being rendered. The rendered content list is displayed for selection by a user (606).

According to certain embodiments, the content can be presented to a user as if it is in the format needed for a particular client—even if the content does not actually exist in that format until the time that the user selects the content for viewing (or editing). In some embodiments, the content list can be displayed as shown in FIGS. 4 and 5A-5D.

A determination can be made whether a selection of the displayed content is made by a user through an input device (608). The determination can be based on sensing an appropriate input (via the input device), such as a touch, a gesture, a mouse click, or the like. If no selection is received, the library can remain displayed on standby for some user action or be dismissed (610). For example, the display may remain until the user actively exits the library or after a period of time. In some cases, the content listing may refresh with updated or newly available content.

If a selection from a user input device is received, the client can request the selection from the service (612). For example, as illustrated in FIG. 4, the user may select content 411 from the listing 410 of content available. Because a listing of all content is displayed, the selected content may be of a different or incompatible file format. However, the client receives the selected content in a consumable format for the client (614). In accordance with embodiments of the invention, the client is not required to perform a conversion to an appropriate file format. Once the content is received in the consumable format, the content can be displayed (616).

In some embodiments, the requesting of the selection (612) can be a call to a service that performs the conversion. In some embodiments, the content library and conversion services may be separate services.

Figure 7:
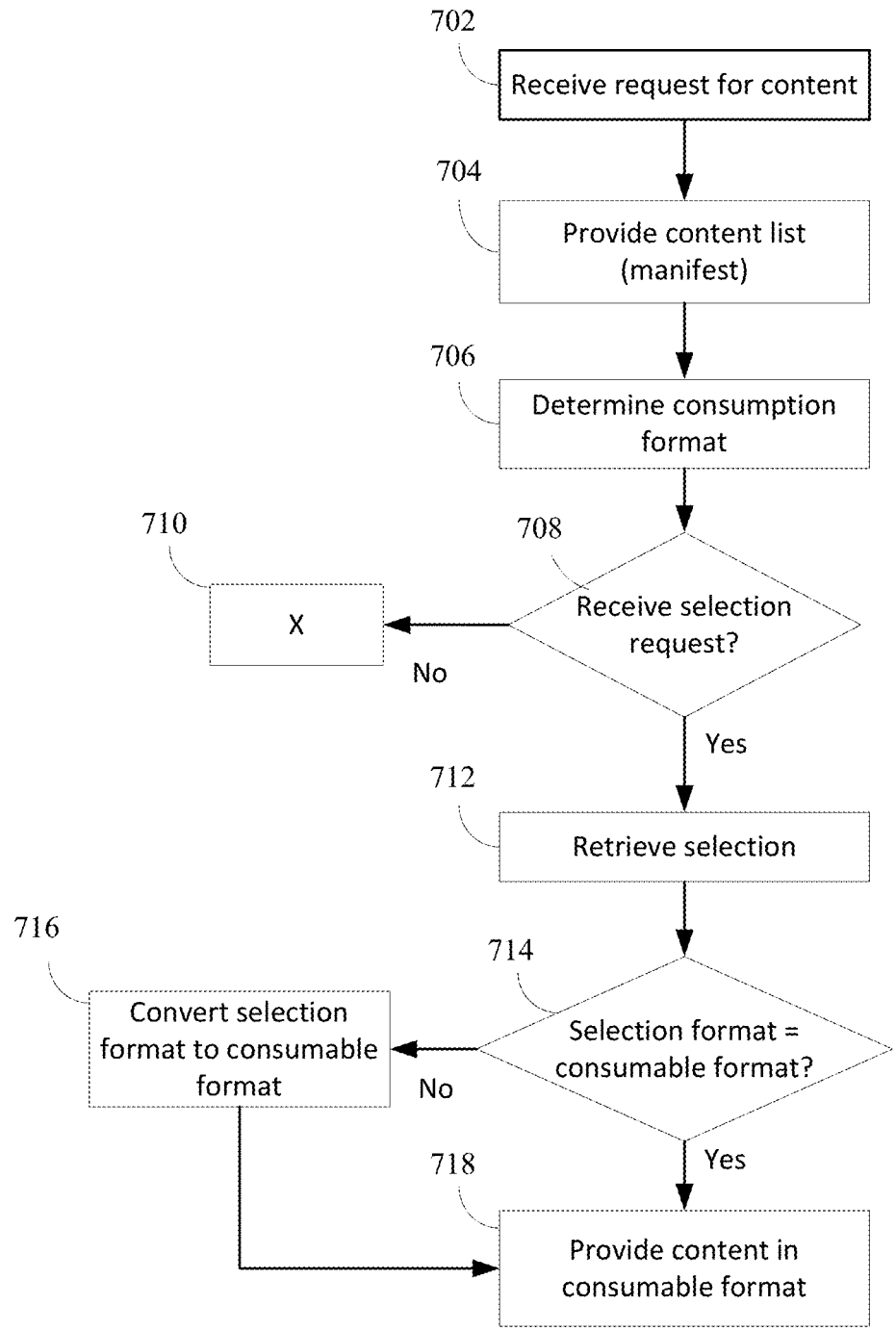
FIG. 7 shows a process flow diagram of a method of providing content according to an embodiment of the invention.

FIG. 7 shows a process flow diagram of a method of providing content according to an embodiment of the invention. The method may be carried out on a server (which may be part of a cloud computing environment). In response to receiving a request for content (702), for example by a client over a network, a content list (or manifest) can be output (704). As mentioned above, the content list provides a listing of available content from a content library (e.g., library 405 of FIG. 4). The content library can be a virtual library stored in association with the server. For example the virtual library may be stored as a collection of addressable files (see e.g., virtual library 340 of FIG. 3). The content list provided in step (704) may include a listing of documents that would not typically be consumable (or supported) by the client requesting the content due to being of a different (and possibly incompatible) file format.

A determination can be made as to the particular consumption format for the client requesting the content (706). The determination can include, but is not limited to, a determination of computing device characteristics—including processing power, dimensions of display screen, screen resolution, printer dots per inch (DPI), power supply (battery or AC power), and available input devices; a determination of operating system and software application(s) running on the device; a determination of saved user preferences; and/or a determination of bandwidth or speed of a network connection. By making a determination as to consumption format of a client requesting the content, embodiments can extend the reach where content can be consumed and create an experience for that content that is suited for the device on which the content is provided.

After providing the content list (704), a determination can be made as to whether a selection request is received (708). The determination may be a stateless operation. In one embodiment, the client may terminate the process at any point and can pick up the process again using an old content list (e.g., stateless operation). If a user requests an item that has subsequently been removed, the service can indicate that the operation failed (710).

If a selection request is received, then the selected content is retrieved if available (712). If the content has become unavailable in the interim, then the selection request will fail (710) (and an error message may be provided). The content can be retrieved using an address stored with the virtual library. The retrieval may be a request to a third party service or database. In another embodiment, the content may be stored in a database associated with the server and can be retrieved directly.

According to an embodiment, a determination can be made as to whether the selected content's file format matches the appropriate consumable format for the client (714). In one embodiment, information associated with the content, including, but not limited to, information about the file format of the stored content, may be stored along with the address of the source containing the content. If it is determined that the file format of the selected content is not a format consumable by the client, then the content is converted to a consumable format (716) before providing the content to the client (718). Otherwise, if the file format of the selected content is in the consumable format, then the selected content is provided directly (without conversion).

Although the determination of the client's consumption format (706) is shown as occurring after providing the content list (704), it should be understood that the determination may occur at any time before providing the content to the client (716). For example, the determination of the client's consumption format can be carried out at the time of the initial request for content, after the initial request, after providing the content list, after receiving a selection request, or even after retrieving the content from a storage location.

Embodiments can extend the reach where content can be consumed and create an experience for that content suitable for the device on which the content is provided. The service can interpret the device and capabilities to determine what is a desired or suitable way to view the content on the particular device. Features that the service can take into consideration include, but are not limited to dimension of a display, user input capabilities of the device, speed and/or bandwidth of a network connection, as well as operating system and application constraints.

For example, some documents may look great displayed on a laptop, but not quite as useable on a smaller screen such as on a phone or tablet. By determining what the client is (such as determining the consumption format appropriate for the client 706), the service modifies the consumption experience based on the device (or software).

One example is a scenario where the consumer device is a touch enabled device, but the document is not really touch-enabled ready. The service can augment the document to make the document more touch-enabled ready by, for example, providing zooming or enlarged features. As an illustrative example, a table in a document originally created on a large screen device but is being provided for rendering on a small screen device can have a touch aspect added that allows the table to get zoomed in (for viewing).

Alternatively, or in addition, by taking the dimensions of a small device into consideration, the service can determine that there is space for only one column out of a three-column table and will present the table in the form suitable for the small screen. This may include adding zooming features or only displaying one column at a time.

By using the content access services, content can be tailored to older versions of existing products. For example, a user may be able to delay upgrading to a newest version of a software application or require that a next version be backward compatible in order to read older/newer file format extensions because the file the user (running the newest program and vice versa) will receive can be tailored based on the endpoint.

For example, a client running MICROSOFT OFFICE 2013 may receive a full view with all features available, but when the same document is opened from a client running MICROSOFT OFFICE 2007, the service may package the content for consumption view but optimized for MICROSOFT OFFICE 2007. The optimization can include replacing certain features with those of the appropriate fidelity. As an example, an equation editor provided in one version may not be backwards compatible. Therefore, the service may replace the equation in the document package with an image of the equation or with a form that is editable in an equation editor suitable for the version in which the document is provided.

A similar experience can be provided for other productivity applications, including word processing applications. For example, a client running MICROSOFT OFFICE 2013 may receive a full view with all features available, but when the same document is opened from a client running another productivity application such as GOOGLE DOCS available from Google Inc., APACHE OPENOFFICE available from the Apache Software Foundation, or ZOHO OFFICE available from Zoho Corporation, the service may package the content for consumption view but optimized for GOOGLE DOCS, OPENOFFICE, or ZOHO OFFICE.

Further embodiments may utilize an identity manager to facilitate the service knowing who the user is and what documents the user cares about. By knowing the identity of the user, the service can retrieve the user's content (e.g., documents) across multiple devices (e.g., the user's computer, laptop, tablet, smartphone, ebook reader and the like) and services (e.g., file hosting services such as the DROPBOX service from Dropbox Inc. and the MICROSOFT SKYDRIVE service from Microsoft Corp.)—on the user's behalf.

In addition, by knowing the client on which the document is to be provided, the system can take the document in one format and convert the document into a customized format for a client being used by the user. For example, a user may be working on a document in MICROSOFT WORD and would like to access the document on her ebook reader. In one such case, the service can present the document to the user as part of the virtual library when the user requests to view available files from her ebook reader (e.g., so the user can read it on the ebook reader). This can remove the steps a user currently takes to send a document to an ebook reader (in order to have the document converted to the appropriate format).

Figure 8:
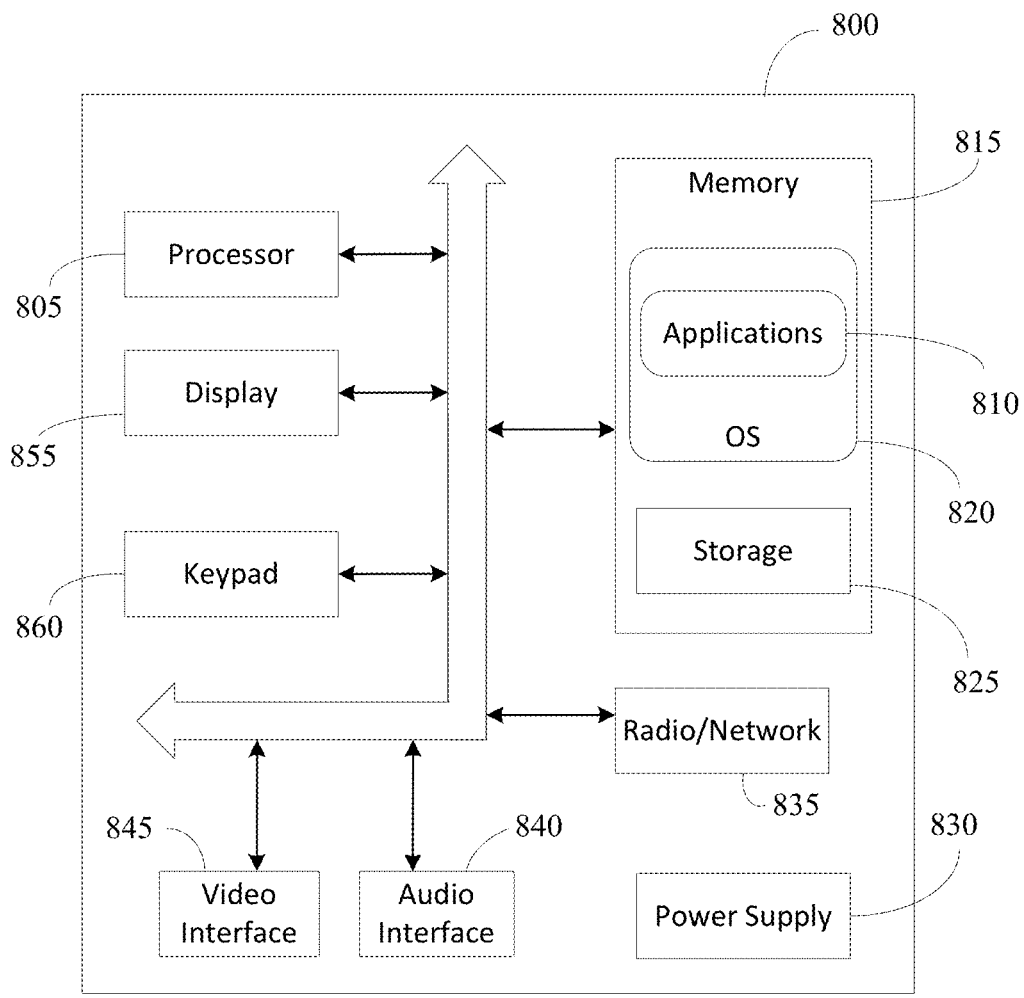
FIG. 8 shows a block diagram illustrating components of a computing device used in some embodiments.

FIG. 8 shows a block diagram illustrating components of a computing device used in some embodiments. For example, system 800 can be used in implementing a user or client device in the form of a desktop or notebook computer or a tablet or a smart phone or the like that can run one or more applications. In some embodiments, system 800 is an integrated computing device, such as an integrated PDA and wireless phone. It should be understood that aspects of the system described herein are applicable to both mobile and traditional desktop computers, as well as server computers and other computer systems. For example, touchscreen or touch-enabled devices (included, but not limited to touch-enabled track pad or mouse) may be applicable to both mobile and desktop devices.

System 800 includes a processor 805 that processes data according to instructions of one or more application programs 810, and/or operating system 820. The processor 805 may be, or is included in, a system-on-chip (SoC) along with one or more other components such as sensors (e.g., magnetometer, an ambient light sensor, a proximity sensor, an accelerometer, a gyroscope, a Global Positioning System sensor, temperature sensor, shock sensor) and network connectivity components (e.g., including Radio/network interface 835).

The one or more application programs 810 may be loaded into memory 815 and run on or in association with the operating system 820. Examples of application programs include phone dialer programs, e-mail programs, PIM programs, word processing programs, spreadsheet programs, Internet browser programs, messaging programs, game programs, and the like. Other applications may be loaded into memory 815 and run on the device, including various client and server applications.

It can be understood that the memory 815 may involve one or more memory components including integrated and removable memory components and that one or more of the memory components can store an operating system. According to various embodiments, the operating system includes, but is not limited to, SYMBIAN OS from Symbian Ltd., WINDOWS MOBILE OS from Microsoft Corporation, WINDOWS PHONE OS from Microsoft Corporation, WINDOWS from Microsoft Corporation, PALM WEBOS from Hewlett-Packard Company, BLACKBERRY OS from Research In Motion Limited, APPLE IOS from Apple Inc., and GOOGLE ANDROID OS from Google Inc. Other operating systems are contemplated.

System 800 also includes non-volatile storage 825 within memory 815. Non-volatile storage 825 may be used to store persistent information that should not be lost if system 800 is powered down. Application programs 810 may use and store information in non-volatile storage 825, such as a record of commands executed during the creation or modification of content in a productivity application and the like. A synchronization application may also be included and reside as part of the application programs 810 for interacting with a corresponding synchronization application on a host computer system (such as a server) to keep the information stored in non-volatile storage 825 synchronized with corresponding information stored at the host computer system.

System 800 has a power supply 830, which may be implemented as one or more batteries and/or an energy harvester (ambient-radiation, photovoltaic, piezoelectric, thermoelectric, electrostatic, and the like). Power supply 830 may further include an external power source, such as an AC adapter or a powered docking cradle that supplements or recharges the batteries.

System 800 may also include a radio/network interface 835 that performs the function of transmitting and receiving radio frequency communications. The radio/network interface 835 facilitates wireless connectivity between system 800 and the "outside world," via a communications carrier or service provider. Transmissions to and from the radio/network interface 835 are conducted under control of the operating system 820, which disseminates communications received by the radio/network interface 835 to application programs 810 and vice versa.

The radio/network interface 835 allows system 800 to communicate with other computing devices, including server computing devices and other client devices, over a network.

An audio interface 840 can be used to provide audible signals to and receive audible signals from the user. For example, the audio interface 840 can be coupled to speaker to provide audible output and a microphone to receive audible input, such as to facilitate a telephone conversation. A speaker may also be incorporated so that a user may interact with the computing device via voice commands.

System 800 may further include video interface 845 that enables an operation of an optional camera (not shown) to record still images, video stream, and the like. A camera may also be used to capture gestures used for interacting with the computing device.

Visual output can be provided via a touch screen display 855. In some cases, the display may not be touch screen and user input elements, such as buttons, keys, roller wheel, and the like are used to select items displayed as part of a graphical user interface on the display 855. A keypad 860 can also be included for user input. The keypad 860 may be a physical keypad or a soft keypad generated on the touch screen display 855. In some embodiments, the display and the keypad are combined. In some embodiments two or more input/output (I/O) components including the audio interface 840 and video interface 845 may be combined. Discrete processors may be included with the I/O components or processing functionality may be built-in to the processor 805.

The display 855 may present graphical user interface ("GUI") elements, a predictive contextual toolbar user interface, text, images, video, notifications, virtual buttons, virtual keyboards, messaging data, Internet content, device status, time, date, calendar data, preferences, map information, location information, and any other information that is capable of being presented in a visual form. In some embodiments, the display 855 is a liquid crystal display ("LCD") utilizing any active or passive matrix technology and any backlighting technology (if used). In some embodiments, the display 855 is an organic light emitting diode ("OLED") display. Of course, other display types are contemplated.

A touchscreen (which may be associated with the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

In other embodiments, a touch pad may be incorporated on a surface of the computing device that does not include the display. For example, the computing device may have a touchscreen incorporated on top of the display and a touch pad on a surface opposite the display.

In some embodiments, the touchscreen is a single-touch touchscreen. In other embodiments, the touchscreen is a multi-touch touchscreen. In some embodiments, the touchscreen is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen. As such, a developer may create gestures that are specific to a particular application program.

In some embodiments, the touchscreen supports a tap gesture in which a user taps the touchscreen once on an item presented on the display. The tap gesture may be used for various reasons including, but not limited to, opening or launching whatever the user taps. In some embodiments, the touchscreen supports a double tap gesture in which a user taps the touchscreen twice on an item presented on the display. The double tap gesture may be used for various reasons including, but not limited to, zooming in or zooming out in stages, and selecting a word of text. In some embodiments, the touchscreen supports a tap and hold gesture in which a user taps the touchscreen and maintains contact for at least a pre-defined time. The tap and hold gesture may be used for various reasons including, but not limited to, opening a context-specific menu.

In some embodiments, the touchscreen supports a pan gesture in which a user places a finger on the touchscreen and maintains contact with the touchscreen while moving the finger on the touchscreen. The pan gesture may be used for various reasons including, but not limited to, moving through screens, images, or menus at a controlled rate. Multiple finger pan gestures are also contemplated. In some embodiments, the touchscreen supports a flick gesture in which a user swipes a finger in the direction the user wants the screen to move. The flick gesture may be used for various reasons including, but not limited to, scrolling horizontally or vertically through menus or pages. In some embodiments, the touchscreen supports a pinch and stretch gesture in which a user makes a pinching motion with two fingers (e.g., thumb and forefinger) on the touchscreen or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes, a nose, chin, or objects such as styluses may be used to interact with the touchscreen. As such, the above gestures should be understood as being illustrative and should not be construed as being limiting in any way.

It should be understood that any mobile or desktop computing device implementing system 800 may have more or fewer features or functionality than described and is not limited to the configurations described herein.

In various implementations, data/information stored via the system 800 may include data caches stored locally on the device or the data may be stored on any number of storage media that may be accessed by the device via the radio/network interface 835 or via a wired connection between the device and a separate computing device associated with the device, for example, a server computer in a distributed computing network, such as the Internet. As should be appreciated such data/information may be accessed through the device via the radio interface 835 or a distributed computing network. Similarly, such data/information may be readily transferred between computing devices for storage and use according to well-known data/information transfer and storage means, including electronic mail and collaborative data/information sharing systems.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Embodiments may be implemented as a computer process, a computing system, or as an article of manufacture, such as a computer program product or computer-readable medium. Certain methods and processes described herein can be embodied as code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Computer-readable media can be any available computer-readable storage media or communication media that can be accessed by the computer system.

Communication media include the media by which a communication signal containing, for example, computer-readable instructions, data structures, program modules, or other data, is transmitted from one system to another system. The communication media can include guided transmission media, such as cables and wires (e.g., fiber optic, coaxial, and the like), and wireless (unguided transmission) media, such as acoustic, electromagnetic, RF, microwave and infrared, that can propagate energy waves. Computer-readable instructions, data structures, program modules, or other data can be embodied as a modulated data signal in, for example, a wireless medium such as a carrier wave or similar mechanism such as employed as part of a spread spectrum technique. The term "modulated data signal" refers to a signal that has one or more of its characteristics changed or set in a manner as to encode information in the signal. The modulation may be analog, digital or a mixed modulation technique. Communication media, particularly carrier waves and other propagating signals that may contain data usable by a computer system, are not included as computer-readable storage media.

By way of example, and not limitation, computer-readable storage media may include volatile and non-volatile, removable and non-removable media implemented in any method or technology for storage of information such as computer-readable instructions, data structures, program modules or other data. For example, a computer-readable storage medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data for use by a computer system. "Computer-readable storage media" do not consist of carrier waves or propagating signals.

In addition, the methods and processes described herein can be implemented in hardware modules. For example, the hardware modules can include, but are not limited to, application-specific integrated circuit (ASIC) chips, field programmable gate arrays (FPGAs), and other programmable logic devices now known or later developed. When the hardware modules are activated, the hardware modules perform the methods and processes included within the hardware modules.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A method comprising:
   providing a library of available files of content for selection from a server, the available files of content being all files irrespective of a supported file format for a consumer device receiving the library, wherein the library of available files of content for selection comprises at least one file of content stored in the supported file format and at least one file of content stored in a non-supported file format;
   automatically determining, at the server, a consumption format for the consumer device receiving the library from a communication between the server and the consumer device, the communication comprising information about the consumer device or a user identification, wherein the determining of the consumption format for the consumer device receiving the library is performed in response to receiving a request to provide the library of available files of content for selection; and
   in response to receiving a request for a selected file of content from among the library of available files of content:

determine whether the selected file of content is in the supported file format for the consumer device or is not in the supported file format for the consumer device;

if the selected file of content is determined to be in the supported file format for the consumer device, then providing the selected file of content in the consumption format; and if the selected file of content is determined to not be in the supported file format for the consumer device, then converting the selected file of content to the supported file format for the consumer device and providing the selected file of content in the consumption format.

2. The method of claim 1, wherein determining the consumption format for the consumer device receiving the library comprises determining the supported file format for the consumer device.

3. The method of claim 2, wherein determining the consumption format for the consumer device receiving the library further comprises:

determining at least one of processing power of the consumer device, dimensions of a display of the consumer device, available input devices of the consumer device, and bandwidth of a network connection to the consumer device.

4. The method of claim 1, wherein the library of available files of content for selection is provided without an indication of each file's file format.

5. The method of claim 1, wherein providing the library of available files of content for selection comprises providing an indication that the files of content are of the supported file format irrespective of each file's actual file format.

6. The method of claim 1, wherein the determining of the consumption format for the consumer device receiving the library is performed in response to receiving the request for the selected file of content from among the library of available files of content.

7. The method of claim 1, wherein converting the selected file of content to the supported file format for the consumer device and providing the selected file of content in the consumption format comprises:

converting the selected file of content to an intermediate format and providing the selected file of content in the intermediate format to a second conversion service to convert the selected file of content in the intermediate format to the supported file format for the consumer device.

* * * * *